Patented Feb. 22, 1927.

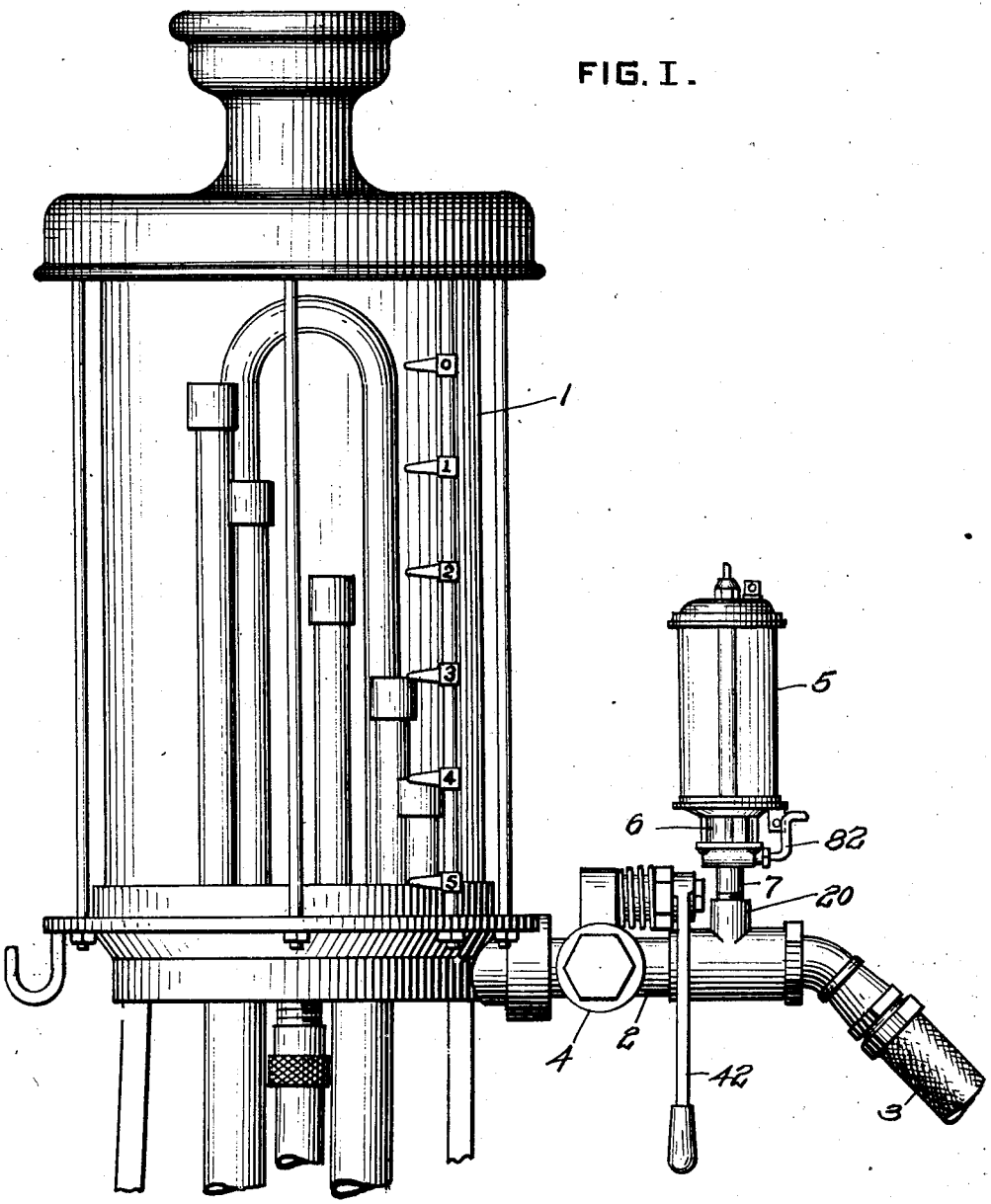
FIG. I.

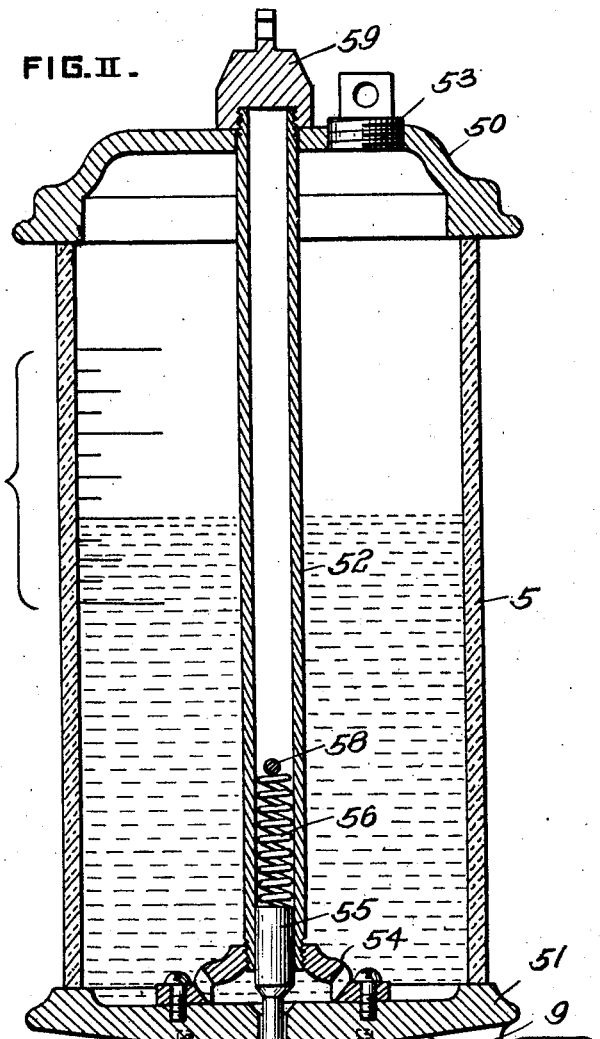
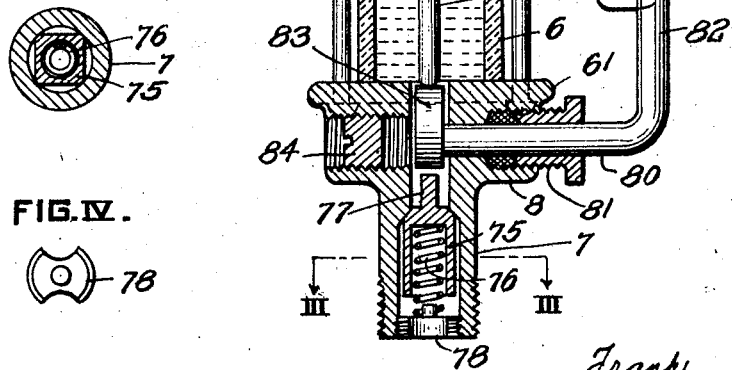

1,618,621

UNITED STATES PATENT OFFICE.

FRANK WOODRUFF, OF ROCHESTER, AND GEORGE W. MacKENZIE, OF BEAVER, PENNSYLVANIA, ASSIGNORS TO CORRECT MEASURE COMPANY, OF ROCHESTER, PENNSYLVANIA, A CORPORATION OF PENNSYLVANIA.

LIQUID-DISPENSING APPARATUS.

Application filed September 26, 1925. Serial No. 58,689.

Our invention relates to improvements in liquid-dispensing apparatus, and consists particularly in apparatus which is auxiliary to such apparatus now commonly in use for dispensing gasoline. This auxiliary apparatus of our invention is effective to introduce into gasoline as it flows to delivery to a customer, a proportionately measured quantity of another liquid. The actual material so introduced is not essential to the invention; suffice it to say that gasoline as now commonly dispensed is enriched and rendered more stisfactory in service by the introduction into and the mingling with it of another liquid. And this other liquid should be introduced in measured quantity, and, as the practice now is, in relatively small proportion.

In the accompanying drawings Fig. I is a view in side elevation showing a portion of a gasoline-dispensing installation of otherwise typical form, having applied to and combined with it the auxiliary apparatus of our present invention. Fig. II is a view to larger scale, showing in vertical and medial section the auxiliary apparatus alone. Fig. III is a view in cross-section, on the plane indicated at III—III, Fig. II. Fig. IV is a view in elevation of a certain part, detached.

Referring first to Fig. I, 1 indicates the measuring chamber of gasoline-dispensing apparatus of typical form; 2 is the delivery pipe leading therefrom, and which is continued in the hose 3. 4 is the casing of the delivery control valve, and 42 the valve-operating crank arm. From the measuring chamber 1, on the opening of valve 4, an exactly measured quantity of gasoline is delivered through the hose 3 to the tank in the customer's car, or other receptacle prepared for it.

In the delivery pipe 2 is introduced a T fitting with an upwardly extending branch 20, and into the branch 20 the auxiliary apparatus is screwed, and thus the auxiliary apparatus is supported. The auxiliary apparatus includes a reservoir 5, a measuring chamber 6, and a delivery pipe 7, all standing in vertical alignment as shown. These parts, constructed as we are about to describe, are integrated, and when the delivery pipe 7 is screwed into branch 20 of the T fitting referred to, the whole stands rigid.

Referring to Fig. II, the reservoir conveniently takes the form of a transparent cylinder of glass, to which the numeral 5 is immediately applied, bolted between cast metal heads 50 and 51. The bolt in this instance takes the form of a central hollow column 52, which serves further ends, presently to be described. The cylinder 5 may make liquid-tight joint with the lower head (and with the upper as well, if desired), by means well known to the art, although particular illustration of that structural detail is not deemed important here. A filling orifice with a suitable closure 53 may be formed in the upper head 50. The closure 53 and the clamping nut 59 by which the bolting of the parts is effected, may, as shown in Fig. II be provided with eyes, through which locking means may be introduced and secured.

The measuring chamber 6 of this auxiliary apparatus is here shown to consist of a glass cylinder, to which the numeral 6 is immediately applied, arranged in axial alignment with cylinder 5 and by a plate 61 bolted against the under side of cylinder head 51. The plate 51 thus becomes a cylinder head common to the two cylinders. The joints between cylinder 6 and plates 51 above and 61 beneath are made liquid-tight in well-known manner.

Cast preferably in one piece with plate 61 are a casing 8, presently to be described, and the delivery pipe 7, the general nature of which has already been indicated. Plates 51 and 61 are orificed in the axis of the reservoir above and the delivery pipe below. To afford free egress of liquid from the reservoir through the axial orifice in the plate 51, the plate 51 carries a spider 54, which the column 52 at its lower end immediately engages.

A vertically moving valve 55 descends to its seat, to cut off flow of liquid from the reservoir 5 through the orifice in plate 51 to the measuring chamber 6, and rises to allow such flow. The valve is normally held by the tension of a spring 56 to its seat. The valve is provided with a stem 57 which extends vertically downward, axially through measuring chamber 6, for engagement by valve-shifting means presently to be described. The hollow column 52 conveniently affords a guideway for the valve 55 and casing for the spring 56. Backing for the spring may be afforded by a pin 58 driven through the column. All of these features clearly appear in Fig. II.

Within the delivery pipe 7 a valve seat is formed, and valve 75 is arranged to rise to this seat, to cut off flow, and to descend to allow flow. This valve also is normally held to its seat by a spring 76, which spring is backed by a bridge 78 screwed to place and spanning (though not cutting off) the passageway through the pipe (cf. Fig. IV). The body of the valve 75, too, is so particularly shaped (cf. Figs. II and III) that, while the valve is properly guided in its reciprocation, when it is unseated the line of flow is open. The valve 75 also is provided with an operating stem 77, and this stem extends axially upward, in alignment with the stem 57 of valve 55 above.

Within the casing 8 a stem 80 extends in common axial plane with and perpendicular to the aligned valve stems 57 and 77. The stem extends through a packing gland and a bearing block 81 in the casing wall and is formed externally with a crank 82, by means of which it may be rotated. The stem 80 carries, within the casing 8 and in the axis of the structure an eccentric disk 83. The passageway is sufficiently enlarged to allow free play of this disk, with space for free flow of liquid around it. The eccentric disk is so proportioned and adjusted and the valve stems 57 and 77 are so adjusted in length relatively to it, that as stem 80 is turned through a half revolution and back again, the two valves 55 and 75 are alternately shifted from their seats, against the seating tension of their backing springs. Fig. II shows the stem 57 of valve 55 engaged by the disk 83 and the valve thereby held remote from its seat, spring 56 being proportionally compressed. At the same time valve 75, freely responsive to the tension of spring 76, is by such tension held to its seat. Rotation of stem 80 will effect a swinging of the eccentric disk 83 and in consequence valve 75 will similarly be carried from its seat, while valve 55 left free to respond to the tension of spring 56, will close. A lug 9 may be cast integral with plate 51, to serve as a stop, limiting the range of turning of crank 82, and such lug may be provided with an eye, as shown in Fig. II, by means of which crank arm 82 may, on occasion, be locked, against turning.

The space within casing 8 is made adjustable in volumetric content, to the end that the instruments may be calibrated individually, to deliver with precision the desired measure of liquid. Such adjustment is found in the plug 84 which may be screwed in and out in a bore in the casing wall.

The vertically standing transparent-walled cylinder 5 may carry externally or internally a visible scale, by means of which the attendant may know precisely how much of a supply of liquid he has on hand, and both he and the purchaser as well may have check upon the accuracy of the delivery. Such scales are well known in this art and require no minute showing—however, Fig. II bears indication at 10 that the glass cylinder 5 may be scored or painted, to afford such a scale. This showing will be understood to be diagrammatic.

In operation, when the parts are in the position shown in Fig. II, liquid has desecended from reservoir 5, and measuring chamber 6 is full. Escape of liquid is however cut off by valve 75. When delivery is to be made, crank 82 is turned through half a revolution, and the valve positions are reversed; valve 55 is closed, cutting off the flow of additional quantities of liquid from the reservoir,—and valve 75 is opened, allowing the volumetric unit of liquid segregated beneath valve 55 to escape through the delivery pipe 7.

Turning back to Fig. I it will be seen that the sequent shifting of the crank 42 which controls delivery of gasoline from measuring chamber 1 and of the crank 82, will cause a measured charge of the liqiud from reservoir 5 to enter and mingle with the stream of a predetermined unit of gasoline, as it flows to the point of delivery. Delivery is to the atmosphere, and escape is free.

We claim as our invention:

In liquid-dispensing apparatus the combination of two axially aligned and vertically arranged cylindrical chambers with an axial port opening from the upper chamber to the lower and an axial port opening through the lower head of the lower chamber, an upper valve for the first named port adapted to close in the direction of flow, and a lower valve for the second named port adapted to open in the direction of flow, yielding means cooperating with each valve and tending to hold the valve to its seat, and means for opening the valves in alternation against the tension of the valve-closing means, the upper chamber consisting of a cylindrical wall bolted between heads, the bolting means including a hollow axially arranged column, and a spider united to the lower head of the upper chamber through which the liquid has access to the axial port in said head, and to which the said hollow column is secured, said hollow column constituting a guide for the upper valve.

In testimony whereof we have hereunto set our hands.

FRANK WOODRUFF.
GEORGE W. MacKENZIE.